No. 753,722. PATENTED MAR. 1, 1904.
E. MANULA & J. CARLSON.
FISH CLEANING MACHINE.
APPLICATION FILED NOV. 9, 1903.
NO MODEL. 2 SHEETS—SHEET 1.
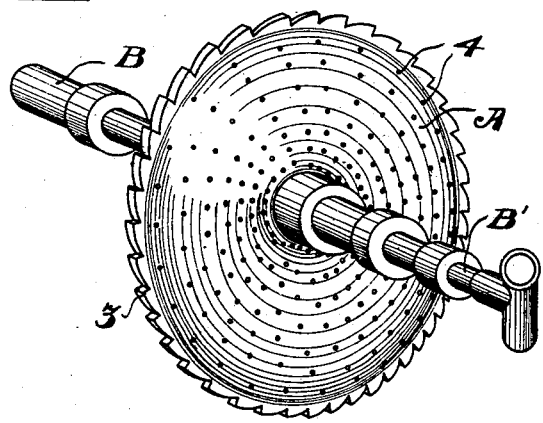
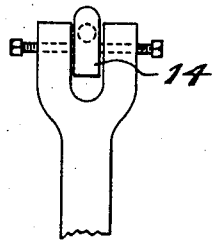
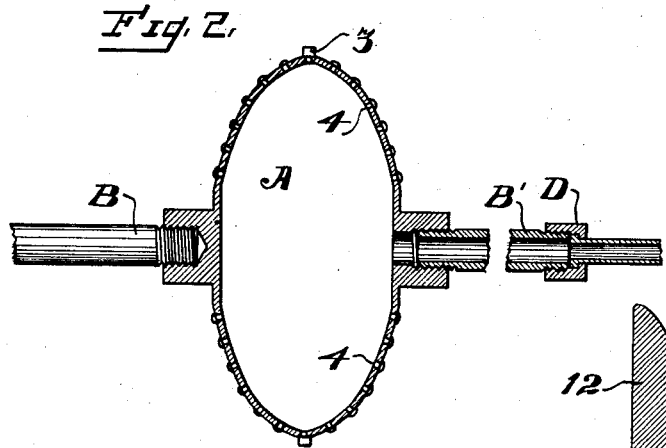
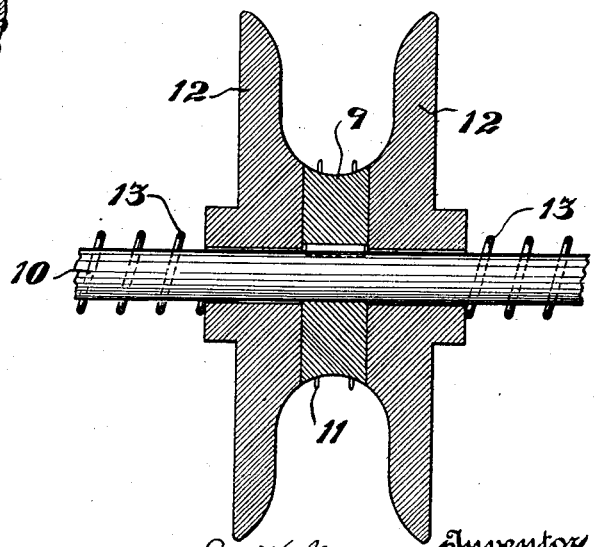
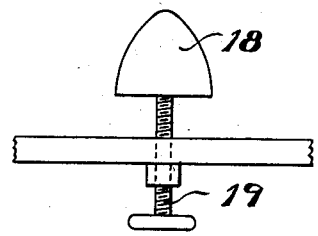

No. 753,722. PATENTED MAR. 1, 1904.
E. MANULA & J. CARLSON.
FISH CLEANING MACHINE.
APPLICATION FILED NOV. 9, 1903.
NO MODEL. 2 SHEETS—SHEET 2.

Witnesses,

Inventors
Erik Manula
John Carlson
By Geo H Strong.
Atty

No. 753,722. Patented March 1, 1904.

UNITED STATES PATENT OFFICE.

ERIK MANULA AND JOHN CARLSON, OF ASTORIA, OREGON.

FISH-CLEANING MACHINE.

SPECIFICATION forming part of Letters Patent No. 753,722, dated March 1, 1904.

Application filed November 9, 1903. Serial No. 180,474. (No model.)

*To all whom it may concern:*

Be it known that we, ERIK MANULA and JOHN CARLSON, citizens of the United States, residing at Astoria, in the county of Clatsop and State of Oregon, have invented new and useful Improvements in Fish-Cleaning Machines, of which the following is a specification.

Our invention relates to a device for more perfectly cleaning the interior visceral cavity of fish and which we term an "inside slimer."

It consists of a hollow lenticular chamber axially mounted upon a driving-shaft and having water communication through said shaft with its interior, perforations made through the sides of the chamber for the discharge of water under pressure, and teeth or scrapers peripherally disposed upon the outer edge of the revoluble chamber.
It also comprises details of construction, which will be more fully explained by reference to the accompanying drawings, in which—

Figure 6:
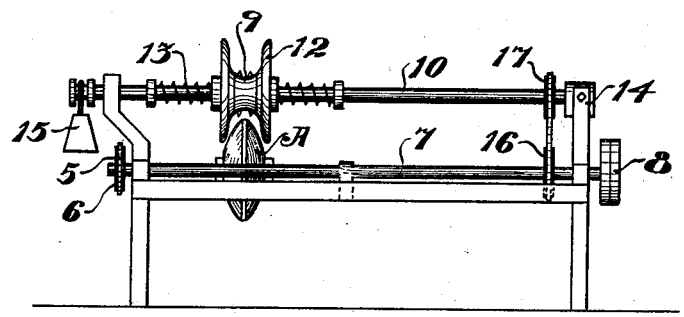
Figure 7:
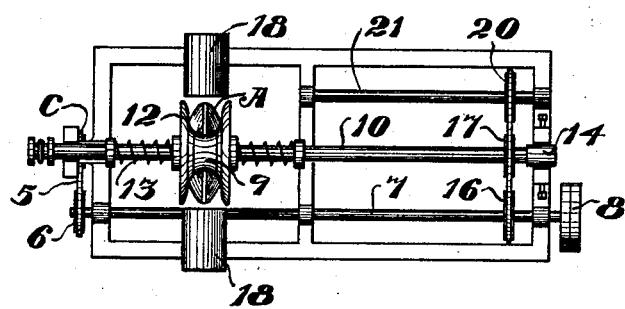
Figure 8:
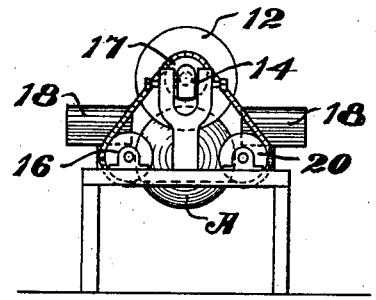

Figure 1 is a perspective of cleaning-chamber. Fig. 2 is a transverse central section of same. Fig. 3 is a central section of pressure-wheel and disks. Fig. 4 is a detail of bearing for pressure-wheel shaft. Fig. 5 is a detail of adjustable guide. Fig. 6 is a side elevation of my machine. Fig. 7 is a plan view of same. Fig. 8 is an end view of same.

In the cleaning of large fish, such as salmon, it is necessary first to open the fish along the belly, remove the viscera, and afterward to cleanse this inside cavity thoroughly.

Large fish like salmon, for which this device is especially designed, have a channel along the line of the backbone covered with a tough membrane and filled with coagulated blood after the intestines have been removed, and it is necessary to remove this membrane and the coagulated blood beneath, as well as to remove any skin or portions which may remain adherent to this cavity after the viscera have been removed.

It is the object of our invention to provide such an apparatus.

We have not here shown any of the other apparatus usual to fish-cleaning machines, except that which forms a part of our present invention, which consists of a hollow lenticular chamber A, mounted upon a shaft, as at B, and provided with any suitable means of driving or rotating it, as by the sprocket C or equivalent driver.

D represents a swivel-joint through which water may be admitted to the interior of the hollow portion of the shaft B', which connects with one side of the chamber A. Around the periphery of this chamber are formed the teeth or scrapers 3.

The shape of the chamber A is approximately that of the interior of the visceral cavity of the fish after the intestines have been removed, and when the fish is to be cleaned it is carried by any suitable support either by hand or mechanically, so that the interior cavity of the fish may be pressed down upon the periphery of the wheel A, when the teeth or scrapers 3 will break the membrane and scrape it and the blood or deposit beneath it out as the fish is passed over the device.

Numerous holes 4 are bored through the sides of the chamber A and also through the periphery in line with the teeth 3, and water being supplied through the coupling D under such pressure as may be desired it will be continually forced out through these openings and into the cavity of the fish, thus thoroughly cleansing the latter of any blood, skin, slime, or other remaining deposit.

As the holes 4 are bored outwardly from the interior of the chamber A, a slight bur will be formed upon the outer edges of the holes, and these burs also act as scrapers as the device revolves in the cavity of the fish, and while the slime and adherent skin is thus removed from the cavity the force of the water-jets will continually wash it away and prevent its adhering to and clogging the discharge-openings.

We have here shown a form of apparatus for conveniently manipulating the fish to be cleaned. In this device the shaft B is journaled in a frame, and power to rotate the shaft is transmitted by a chain 5 through sprockets 6 from a shaft 7, which is provided with driving-pulleys, as at 8.

Above the chamber A is a roller 9, mounted upon a shaft 10 and having teeth 11, adapted to engage the fish and move it over and in contact with the cleaning device A. Upon each side of the driver 9 is a disk 12, turnable loosely upon the shaft 10, and these disks are held up to the roller by springs, as at 13. The inner faces of the disks are so shaped that by the yielding action of the springs they are automatically adjusted to fit the fish and hold it in proper relation with the cleaner A as it passes over said cleaner. The shaft 10 is also adjustable to accommodate varying sizes of fish, as follows: One end of the shaft turns in a journal-box which is pivoted in a support, as at 14. The opposite end of the shaft, or its journal-box, is carried in an open slot or guide and is normally held down by a weight 15, and the driver is thus kept in contact with the back and sides of the fish, whatever may be its size, and the fish is moved along with the cavity to be cleaned in contact with the cleaner A.

The fish-driver may be driven by a chain passing over sprocket-wheels 16 on the shaft 7 and 17 on the shaft 10 and 20 on the shaft 21.

18 represents substantially conical or tapering supports, one upon each side of the cleaner A, and they serve as guides, one to receive the fish before it passes to the cleaner and the other to receive it after it leaves the cleaner. These supports may be adjusted vertically by screws, as at 19.

Having thus described our invention, what we claim, and desire to secure by Letters Patent, is—

1. An inside sliming and cleansing device for salmon and the like, said device consisting of a lenticular axially-journaled chamber having peripheral scrapers, said chamber having perforations for the discharge of water, and a means for supplying water brought under pressure to the interior of the device.

2. A device for sliming and cleansing the intestinal cavities of salmon and the like, said device consisting of a lenticular chamber, the periphery of which approximately conforms to the interior shape of the intestinal cavity, a supporting-framework, a shaft upon which the chamber is mounted, means by which it is revolved, a hollow connection through said shaft with the interior of the chamber, a coupling by which water under pressure may be admitted thereto, said chamber having holes and scrapers made on the surface and periphery.

3. The combination in a device for cleaning the intestinal cavity of salmon and the like, of a lenticular hollow chamber having teeth or scrapers formed upon its peripheral edge and perforations made at the base of said teeth and through the convex sides, a supporting-framework, a journaled shaft upon which the chamber is mounted, means by which the shaft and chamber are revolved, a hollow connection through the shaft with the interior of the chamber and a coupling through which water under pressure may be admitted.

4. A sliming and cleaning device for the intestinal cavity of fish, consisting of a framework, a revoluble lenticular chamber having perforated sides, in combination with means for revolving the cleaner, and means by which the fish is guided and advanced in contact with the cleaner.

5. The combination with a framework, and the lenticular perforated revoluble cleaner, of a revoluble toothed drum in the plane of rotation of the cleaner, means for revolving the drum, disks loosely fitting the drum-shaft on each side of the drum and springs by which the disks are yieldingly held with relation to the drum.

6. The combination in a fish-cleaning device of a framework, a lenticular perforated revoluble chamber, means for revolving the chamber and means to supply water under pressure to its interior, a revoluble toothed drum in the plane of the cleaning-chamber and loosely-turnable spring-pressed disks on each side of said drum, a shaft on which the drum and disks are carried, said shaft and drum being automatically adjustable to or from the cleaning device.

In testimony whereof we have hereunto set our hands in presence of two subscribing witnesses.

ERIK MANULA.
    JOHN CARLSON.

Witnesses:
  J. P. A. BENNETT,
  B. OSBURN.